United States Patent [19]

Kaji

[11] Patent Number: 4,466,670
[45] Date of Patent: Aug. 21, 1984

[54] THREE PIECE WHEEL FOR VEHICLE TIRES

[76] Inventor: Yasutaka Kaji, 3, Chokeiji, Takaoka-shi, Japan

[21] Appl. No.: 286,618

[22] Filed: Jul. 24, 1981

[51] Int. Cl.³ ............................................. B60B 23/00
[52] U.S. Cl. ................................ 301/11 CD; 152/405; 152/398
[58] Field of Search ............... 301/35 R, 35 SS, 63 R, 301/63 D, 63 DD, 96, 9 DN, 10, 11; 152/405–408, 398, 411; 29/159.1, 159.01

[56] References Cited

U.S. PATENT DOCUMENTS

| | | | |
|---|---|---|---|
| 1,586,545 | 6/1926 | Williams | 301/11 R |
| 1,954,757 | 4/1934 | Marvanville | 301/9 DN |
| 3,007,507 | 11/1961 | Sinclair et al. | 152/405 |
| 3,286,757 | 11/1966 | Thomas | 301/63 DD |
| 3,909,065 | 9/1975 | Main | 301/63 R |

FOREIGN PATENT DOCUMENTS 824462 12/1959 United Kingdom ............... 152/405

Primary Examiner—H. Grant Skaggs
Attorney, Agent, or Firm—Lyon & Lyon

[57] ABSTRACT

According to this invention, there is provided a three piece wheel for vehicle tires comprising a disc and dual inner and outer rim and wherein the inner rim and the outer rim are at their radially directed bases secured by a fastening means to a disc mount connected to a hub through a plurality of spike members and the inner rim has an inwardly and axially curved portion formed integrally with the radially directed base thereof, characterized in that an annular V-shaped groove is defined between the inner and outer rims and is filled with a sealing material.

2 Claims, 2 Drawing Figures

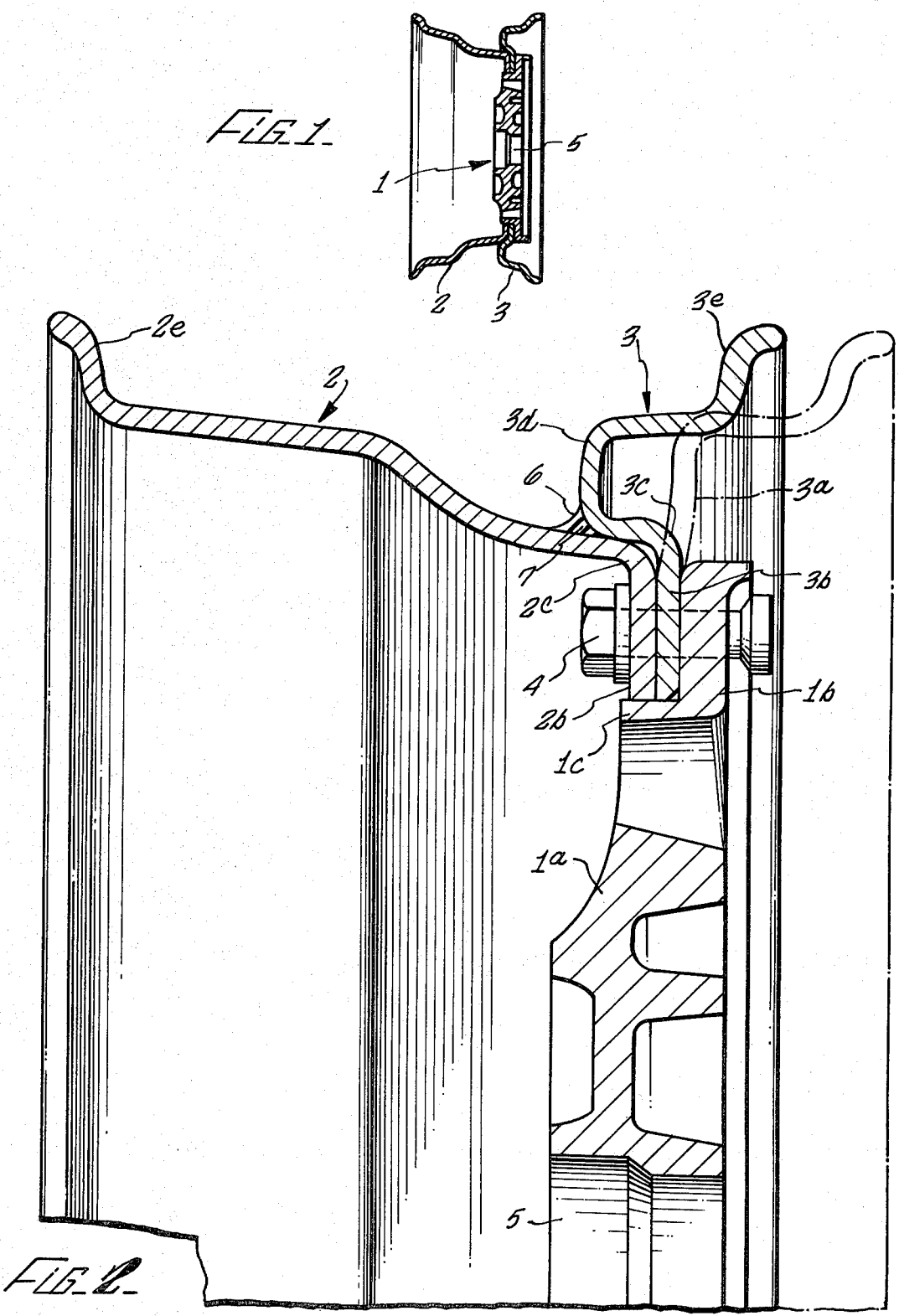

THREE PIECE WHEEL FOR VEHICLE TIRES

BRIEF SUMMARY OF INVENTION

This invention relates to a three piece wheel for vehicle tires, and more particularly to a three piece wheel for carrying tubeless tires.

It has been widely practiced to separately manufacture a disc and a rim and then assemble these parts into a tire carrying wheel by a fastening means, which can facilitate the manufacture of each part. In the wheel industry, the so-called three piece wheel comprised of a disc and dual inner and outer rims have been found to be very advantageous and there have been many proposed types of three piece wheels.

The three piece wheels found in the prior art, however, are generally structures such that radially directed bases of inner and outer rims are in superposition secured to a peripheral mounting of a disc by a fastening means and therefore cannot provide a sufficient degree of strength. Moreover, a complete and definite airtight condition cannot be established and maintained between two parts of a rim so as to prevent the leakage of air in case the wheel is used for carrying a tubeless tire. Provision of a packing material interposed between divided two pieces of rim is proposed and can decrease the air leakage, but will not reach a satisfactory level under the most severe of vehicle driving conditions. Therefore, prior art three piece wheels are generally unsuitable for use as tubeless tire carrying wheels.

It is therefore an object of this invention to provide an improved three piece wheel which will establish and maintain a definite airtight condition between an inner and an outer rim and therefore will be able to serve as a tubeless tire carrying wheel with a longer tire life.

Another object of this invention is to provide a three piece wheel with a greater offset value, which is applicable to F.F. (front engine-front drive) automobiles.

BRIEF DESCRIPTION OF DRAWINGS

The foregoing and other objects as well as the characteristic features of the invention will be more easily understood by the following description and the appended claims when read in conjunction with the accompanying drawings wherein:

FIG. 1 is a sectional view of a three piece wheel for embodying the invention; and FIG. 2 is a fragmentary sectional view, on an enlarged scale, showing the positional relationship between elements of the wheel shown in FIG. 1.

DESCRIPTION OF THE PREFERRED EMBODIMENT

A three piece wheel according to the invention is basically comprised of a disc 1, an inner rim 2 and an outer rim 3, as in the prior art.

The inner rim 1 has an inwardly curved position 2c formed integrally with a radially direct base 2b. The inwardly curved portion 2c is axially and inwardly extended to form an inner rim flange 2e at one end of the inner rim 2 opposite to the radially directed base 2b. The inner rim flange 2e cooperates with an outer rim flange 3e to accommodate a tire in a conventional manner.

At one end of the outer rim 3 opposite to the flange 3e is formed a radially directed base 3b adapted to be in parallel with the inner base 2b. The outer rim 3 may have a conventional cross-sectional configuration 3a as shown by an imaginary line in FIG. 2 and a solid line traces a preferred cross-sectional configuration of the outer rim 3, which has an inwardly curved portion 3c formed integrally with the outer base 3b and curved substantially along the curved portion 2c of the inner rim 2. The outer rim 3 is extended from the curved portion 3c to form a substantially "C"-shaped hairpin turned medial portion 3d thereby separating from the inner rim 2.

The disc 1 has preferably a plurality of spaced apart spoke or mesh members extending radially from a center hub 1a provided with an axle bore 5 for receiving a vehicle axle. A ring mount 1b is connected to the hub 1a by the plurality of the spoke members.

As shown, the inner and outer rim bases 2b, 3b and the disc mount 1b have a common axial bore through which a fastening means referred to generally by the numeral 4, preferably provided with washer 4a, extends to fasten and lock the engagement therebetween. The disc mount 1b preferably has an inside wall 1c directed axially and inwardly and a surface thereof preferably has a suitable axial extent so as to create a hermetical contact the rim bases 2b, 3b.

In this embodiment, between the inner rim 2 and the outer rim 3 is defined a circular V-shaped groove 6 which is filled with a sealing material 7 to establish substantially a definite airtight condition therebetween. Therefore, when the wheel of this invention is to carry a tubeless tire the emission of air will be efficiently prevented to elonate a tire life.

The sealing material can be of any desired type but should satisfy such requirement that some degree of elasticity remains even after the volatile matter is diffused to harden. By this property, a sufficient sealing condition is established and maintained during the most severe driving conditions. According to the inventor's experiments, the filling of a sealing material of silicon resin type with the V-shaped groove shows a satisfactory result that an air pressure of a tubeless tire of 3 to 5 kg/cm$^2$ is maintained while driving a car on a bumping road for a long time. It is therefore readily understood that an air pressure of about 2 kg/cm$^2$, which is a value ordinarily required for automobiles, will be maintained under any heavy condition by the sealing material according to this invention.

While the invention has been shown and described in terms of a preferred embodiment thereof, it should be understood that many changes and modifications will be obvious to one skilled in the art without departing from the true spirit and scope of the invention as defined in the appended claims.

The cross-sectional configuration of the outer rim 3 shown by a solid line can obviously produce a relatively greater offset value for applying to F.F. cars, but the outer rim 3 may be formed as shown by the imaginary line, if the case may be.

What is claimed is:

1. A three-piece wheel for vehicle tires comprising a disc defining an annular projecting mount extending about the perimeter thereof, an inner rim of integral construction defining an annular radial base portion extending parallel to said mount, an outer rim of integral construction defining an annular radial base portion disposed between, parallel to and in abutment with said mount and said base portion of said inner rim, a portion of said outer rim adjacent said base portion thereof defining a substantially "C"-shaped medial portion extending axially inwardly along a portion of said inner rim adjacent the base portion thereof, substantially perpendicularly from said base portion of said inner rim and axially outwardly therefrom to define an annular "V"-shaped groove extending between said inner rim and said medial portion of said outer rim, fastening means extending through the base portions of said inner and outer rims and said mount to secure said rims to said disc and an elastic sealing means disposed in said V-shaped groove to prevent air from passing therethrough.

2. The combination of claim 1 wherein said sealing means is constructed of silicon resin.

* * * * *